March 22, 1966    W. P. CAYWOOD ETAL    3,241,555
CHARGING AND DISCHARGING CIRCUIT FOR
VENTRICULAR DEFIBRILLATOR
Filed June 25, 1962

INVENTORS
WILLIAM P. CAYWOOD
ROBERT S. KUSH
BY
Brown, Critchlow, Flick & Peckham.
ATTORNEYS.

3,241,555
CHARGING AND DISCHARGING CIRCUIT FOR VENTRICULAR DEFIBRILLATOR
William Parks Caywood, Murrysville, and Robert S. Kush, Jeannette, Pa., assignors to Mine Safety Appliances Company, a corporation of Pennsylvania
Filed June 25, 1962, Ser. No. 204,948
6 Claims. (Cl. 128—421)

This invention relates to a charging and discharging circuit for a ventricular defibrillator for use in stopping cardiac fibrillation by the delivery of rapid pulses of electric current, represented by sequential discharges of a plurality of capacitors, through a patient's body in the region of the heart.

It is among the objects of this invention to provide an improved charging and discharging circuit for a ventricular defibrillator, in which a plurality of capacitors are continuously connected in a high voltage charging circuit even during their discharge through the patient; in which a sequence switch (not itself a part of this invention) for serially discharging the capacitors through the patient is so connected to the capacitors and to the electrodes in contact with the patient's body that the operation of the switch will be attended by a minimum of arcing and burning of the switch contacts, whereby the switch may be made smaller than would otherwise be possible; in which, should a short circuit occur in the switch, there will be no resulting harm to the patient and the peak current surge will be largely absorbed by special buffering means in the circuit with a minimum of damage to the switch contacts; and in which the current pulses resulting from the serial discharge of the capacitors will alternate in polarity and have an optimum wave shape for the purpose of cardiac defibrillation.

Other objects of the invention will be apparent from the following description, in connection with the attached drawings, in which.

Figure 1:
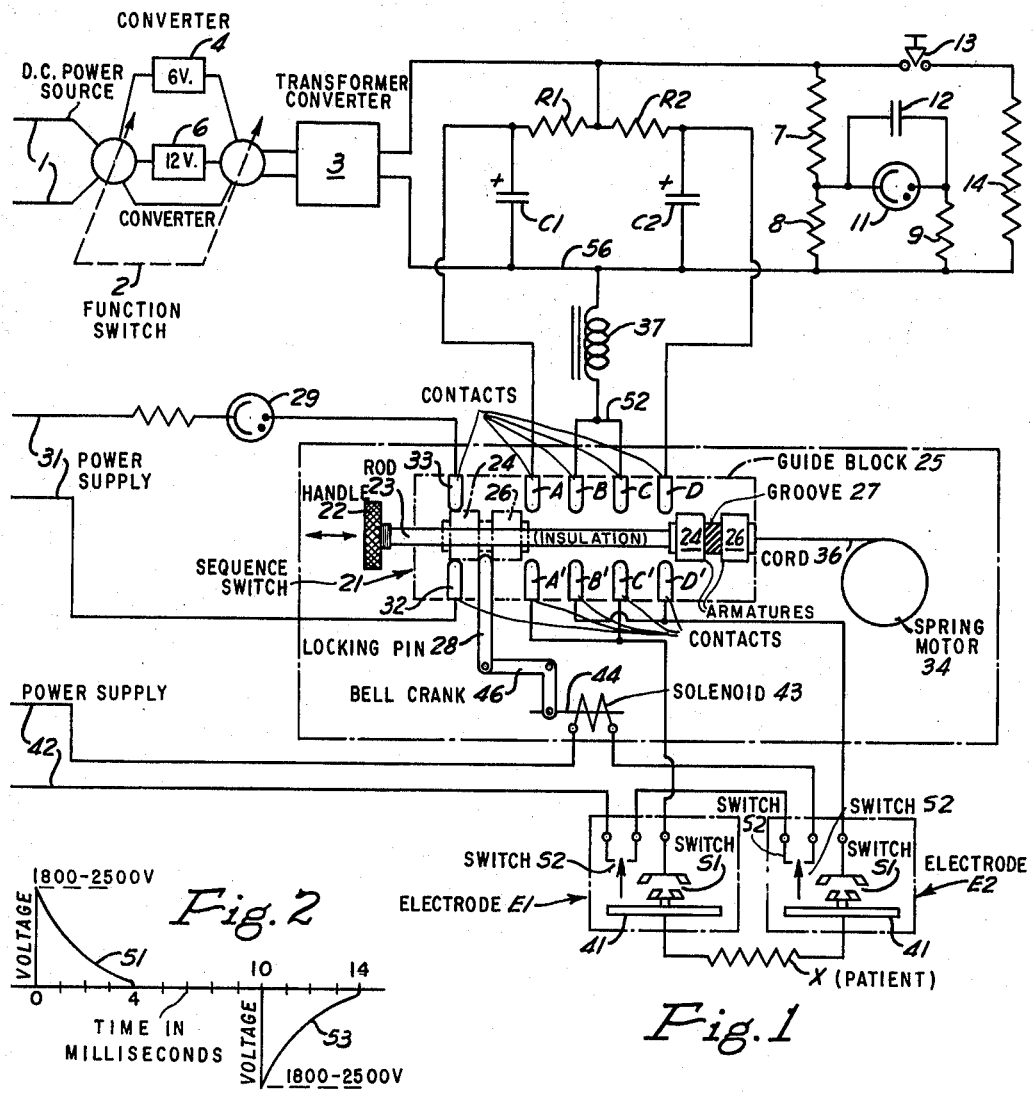
FIG. 1 is a schematic diagram of a defibrillator circuit incorporating the present invention.

In accordance with this invention, the improved defibrillator circuit includes a capacitor charging circuit and a capacitor discharging circuit. The charging circuit comprises a source of high voltage direct current continuously connected to a plurality of capacitors in parallel through a separate isolating and limiting resistor connected in series with each capacitor. The discharge circuit comprises switch means for sequentially connecting the same capacitors through an inductance to a pair of electrodes in contact with the patient's body, these discharge circuit elements being so arranged that the switching means will require a minimum of space and be attended by a minimum of arcing and burning of electrical contacts while delivering current pulses of alternating polarity.

Referring to the drawings, a source of electrical current 1 (which may be either conventional 115 volt A.C., or batteries providing either 6 or 12 volt D.C.) is connected through a function switch 2 to a transformer-converter 3. When source 1 is 115 volts A.C., it is connected directly to the transformer-converter. When the source is a battery, the connection to the transformer-converter is indirect, either through a 6-volt converter 4, or a 12-volt converter 6 (depending upon whether the source is a 6 or a 12 volt battery). The intermediate converters change the 6–12 volts D.C. to 115 volts A.C. In transformer-converter 3, the 115 volt A.C. input is increased and rectified to a high voltage output, on the order of 2,500 volts D.C.

The defibrillator charging circuit includes the high voltage D.C. source 3 connected in parallel to (1) a first capacitor C1 through a first isolating and limiting resistor R1 and (2) a second capacitor C2 through a second similar resistor R2. Resistors R1 and R2 are connected to corresponding sides of their associated capacitors, i.e. between their associated capacitors and the same terminal of the high voltage source. The resistors are connected so as to comprise a center-tapped resistance that will provide equal charging current to both capacitors without affecting the desired current flow or wave form at the patient-contacting electrodes when the capacitors are discharged. Their resistance values are high enough to limit the loss of the stored charge and effectively isolate the parallel connected capacitors at the instant the discharge switch means connects one capacitor to the electrodes. An appropriate value for resistors R1 and R2 is on the order of 30,000 ohms, while the value of capacitors C1 and C2 is suitably around 25 mfd. In this charging circuit, the isolating and limiting resistors R1 and R2 permit the capacitors to be continuously connected to the high voltage source 3 and yet be discharged separately in the manner hereinafter described.

As a matter of convenience, a charge light circuit may be connected across capacitors C1 and C2 and their associated resistors R1 and R2. This latter circuit includes resistors 7, 8, and 9, and a neon glow discharge tube 11 with a capacitor 12 connected across it, as shown in FIG. 1. When capacitors C1 and C2 are charged to an adequate predetermined voltage, tube 11 will blink. A shorting switch 13, in series with a resistor 14, is also connected across capacitors C1 and C2 for discharging them otherwise than through the electrodes to be described below.

In the discharge circuit, capacitors C1 and C2 are connected to a sequence switch generally designated by numeral 21 and shown in diagrammatic section in FIG. 1. This switch is adapted to discharge the capacitors serially and deliver to the patient two short pulses of current with the second pulse following very quickly after the first one and having a reverse polarity. Switch 21 is of the linear plunger type, with a handle 22 at one end of an insulating rod 23 and armatures 24 and 26 at the other end of the rod, the armatures being adapted to reciprocate in the bore of a guide block 25. The two armatures have contact surfaces of conducting material but those surfaces are electrically insulated from each other and separated by a circumferential groove 27. The switch is cocked by pulling the handle, to the left in FIG. 1, until a locking pin 28 drops into groove 27 and holds the armatures in their cocked position (shown in broken lines in FIG. 1). A signal light 29 connected to a low voltage source 31 through contacts 32 and 33, lights up when those contacts are bridged by armature 24 to show that switch 21 is in its cocked position. A spring motor 34 exerts a predetermined axial force on the armatures through a nylon cord 36, urging the armatures to the right towards their uncocked position. In moving from their cocked to their uncocked position, the armatures pass rapidly by and momentarily engage a series of electrical contacts A, B, C, and D, and their diametrically opposed contacts A', B', C', and D'.

While the structure of sequence switch 21 (which is described and claimed in the copending application of Earl M. Becker and John J. Bridge, Serial No. 204,947, filed of even date herewith and assigned to the same assignee) forms no part of the instant application, the connections between the contacts of that switch and other elements of the circuit that are described below are one of the features of this invention. There are a number of ways in which these contacts can be connected to capacitors C1 and C2 and to electrodes E1 and E2 if the object of the connections is merely to discharge the capacitors serially across the electrodes in two pulses of opposite polarity. However, the connections shown in the drawing represent a unique configuration of these circuit elements that has distinct advantages over other configurations in reducing arcing between the contacts and armatures, thereby permitting switch 21 to be of minimum length. In the configuration of this invention, contacts A and D are connected to corresponding sides (in FIG. 1, the positive sides) of capacitors C1 and C2, respectively, while contacts B and C are connected together and then, through an inductance 37, to the other sides (in FIG. 1, the common negative sides) of the same capacitors.

Contacts A' and C' are connected to a normally open first switch S1 in electrode E1, while contacts B' and D' are connected to a similar switch in electrode E2. The other side of each switch S1 is connected to a conducting contact surface 41 on the bottom of each electrode. A second normally open switch S2 is also disposed in each of the electrodes and controls the firing of sequence switch 21. This is done by connecting both switches S2 in series with a source 42 of low voltage current and a solenoid 43, the latter having an armature 44 operating a bell crank 46 connected to locking pin 28 for releasing switch 21 from its cocked position. The electrode switches S1 and S2 are adapted to be closed in succession by firmly pressing the contact surface 41 of each electrode on the patient's body against the urging of a spring (not shown), so that the contact surfaces are connected to the sequence switch contacts a moment before that switch is fired to move the armatures therein towards their uncocked position. Further details of the structure and operation of electrodes E1 and E2 and of switches S1 and S2 are described in the copending application of Earl M. Becker and William C. Stuckrath, Serial No. 204,949, filed of even date herein and assigned to the same assignee.

The defibrillator is ready to be used on a patient as soon as capacitors C1 and C2 are adequately charged. This will be indicated by the blinking of charge light 11. Sequence switch 21 is then cocked, if it is not already in its cocked position; and, in so doing, the armatures will move past the switch contacts A, B, C, etc. No current, however, will flow through the electrodes and the patient's body during the cocking operation, because switches S1 will be open and the contact surfaces of those electrodes will be disconnected from the contacts of the sequence switch. After sequence switch 21 is cocked, electrodes E1 and E2 are both pressed against the patient's external chest wall in the region of the heart, thereby closing switches S1 and S2 in that order and then, and then only, will the contact surfaces of the electrodes be connected to the sequence switch contacts and that switch released from its cocked position.

Figure 2:
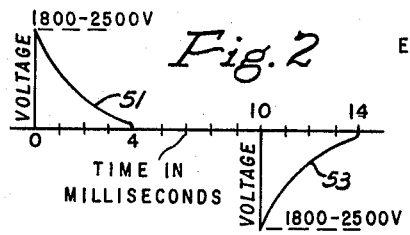
FIG. 2 is a representation of the wave shape produced by the discharge of two capacitors when connected in the circuit of FIG. 1.

As soon as switch 21 is fired, armatures 24 and 26 move quickly to the right. Armature 26 (the leading armature) first bridges contacts A and A' (connected to the positive side of capacitor C1), but no circuit is thereby completed. As the armatures move further to the right, armature 26 bridges contacts B and B' (connected to the common negative sides of both capacitors through choke coil 37) and is no longer in engagement with contacts A and A'; but armature 24 now bridges the latter contacts, completing a circuit that discharges capacitor C1 through choke coil 37, the two electrodes, and the patient's body (here represented by a resistance X). This first pulse of current has the wave form shown by curve 51 of FIG. 2, where the ordinate of the curve indicates voltage; the abscissa, time in milliseconds. As the armatures continue moving rapidly towards their uncocked position, armature 26 next momentarily bridges contacts C and C' at the same time that armature 24 bridges contacts B and B'; but there can be no pulse of current through the electrodes and the patient's body, because both electrodes are connected to the common negative sides of capacitors C1 and C2 and also because those electrodes are directly shorted through conductor 52 that connects contacts B and C. A moment later, when armature 26 bridges contacts D and D' at the same time that armature 24 bridges contacts C and C', capacitor C2 will be discharged through the electrodes and the patient's body, but in a direction reverse to the discharge of capacitor C1. This second pulse of current has the wave form shown by curve 53 of FIG. 2, which is of similar configuration, but of opposite polarity, to curve 51.

The patient will now have received two pulses of high voltage current of opposite polarity, each desirably lasting about four milliseconds and separated by an interval of about six milliseconds (these times can be varied by adjusting the tension of spring motor 34, or the mass of the armatures, or both). Ordinarily, this will be enough to defibrillate his heart. If not, the process can be repeated as often as necessary by recocking the sequence switch (the electrodes, of course, not being pressed against the patient's body during the recocking step) and repeating the firing operation described above.

One of the advantages of the above circuit is that it is attended by a minimum of arcing between the armatures and the contacts of switch 21 when the armatures move from their cocked to their uncocked position. This point is best shown by comparing other circuit arrangements of the switch connections between the capacitors and the electrodes. In one such arrangement, for example, the connections from contacts A and B would be reversed, so that contact A would be connected to the negative side of both capacitors through conductor 52 and choke coil 37, while conductor B would be connected to the positive side of capacitor C1. Similarly, the connections from contacts C and D would also be reversed, so that contact C would be connected to the positive side of capacitor C2 and contact D to the negative side of both capacitors through conductor 52 and choke coil 37. The connections to the electrodes would remain the same as in FIG. 1. This first alternate circuit arrangement will deliver successive pulses of current of opposite polarity; but it will require greater axial spacing between contacts B and C and, therefore, a longer sequence switch than is required with the circuit configuration of FIG. 1. In either case, as armature 26 moves from contact B to contact C, there will be a tendency for an arc to occur between that armature and contact B. In the alternate circuit arrangement, however, if that arc is not extinguished by the time the leading edge of armature 26 approaches contact C, capacitor C2 will be partially (and prematurely) discharged by dividing its charge with previously discharged capacitor C1 through a circuit extending from the positive side of capacitor C2, through contact C and armature 26 and contact B, to the positive side of capacitor C1, and extending from the negative side of capacitor C2, through conductor 56, to the corresponding side of capacitor C1. Accordingly, in this alternate arrangement, when the armatures have moved a little further to the right (and this happens only a few milliseconds later) so as to bridge contacts C–C' and D–D', capacitor C2 will be discharged through the patient before the capacitor has regained its proper charge; and the patient will not receive the desired second voltage pulse. In still another possible circuit arrangement, contacts A and B may be connected just as they are in FIG. 1, but with contacts C and D having their connections reversed, so that contact C is connected to the positive side of capacitor C2, while contact B is connected to the common negative side of both capacitors through choke coil 37 and conductor 52. This circuit arrangement requires different connections to the electrodes, with electrode E1 connected to contacts A' and D', and electrode E2 to contacts B' and C'. In this second alternate arrangement, as armature 26 moves from contact B to contact C, there is the possibility of a direct short circuit (through arcing) across capacitor C2, current flowing from the positive side of that capacitor, through contact C, armature 26, contact B, conductor 52 and choke coil 37, to the negative side of capacitor C2. As a result, capacitor C2 would again be discharged prematurely (and more completely than in the first alternative circuit discussed above) and the patient would receive no second pulse from the defibrillator. In each of these alternate circuit arrangements, which at first glance appear to be mere equivalents of the circuit configuration of FIG. 1, the possibility of arcing in switch 21 and of complete or partial premature discharge of capacitor C2 would damage the switch and fail to give the patient the desired treatment.

A still further advantage of the circuit configuration of FIG. 1 resides in the placement of choke coil 37. A more obvious position for this element might appear to be in one of the conductors connecting switch 21 with one of the electrodes E1 or E2, where the choke coil would be equally effective in modifying, as it does, the wave form of the pulse discharge to the form shown in FIG. 2. However, by putting the choke coil on the capacitor side of switch 21, it performs another useful function in reducing excessive arcing and burning of the contacts under certain conditions. For example, if capacitor C1 is only partially discharged on the firing of sequence switch 21 (such partial discharging occurring if the switch armatures moves too rapidly past contacts A and B), there will be a tendency for this capacitor to continue to discharge by arcing from contact A to armature 24 as that armature approaches contact B. This amounts to a "dead" short of capacitor C1; and, even though it is not fully charged, there would be a heavy current pulse that would burn the contact surfaces of the switch but for the buffering action of choke coil 37. This buffering function could not be performed by the choke coil if it were placed on the other side of the switch in the conductor to one of the electrodes.

Figure 3:
FIG. 3 is a fragmentary schematic diagram showing a modification of the circuit of FIG. 1.
Figure 3:
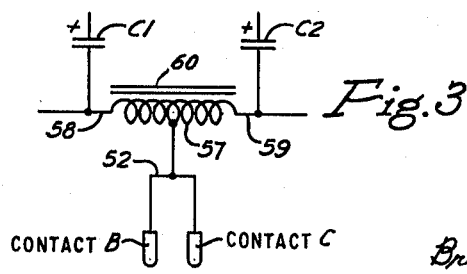

If desired, a modified form of choke coil 57, illustrated in FIG. 3, may be used in place of choke coil 37, shown in FIG. 1. In its modified form, the ends of the coil are connected across capacitors C1 and C2 (in the drawings, across their negative sides) by conductors 58 and 59, while a center tap 61 is connected to conductor 52 and thereby to contacts B and C in sequence switch 21. In an equivalent arrangement, the modified choke coil 57 may be connected across contacts B and C, with its center tap connected to the negative sides of the capacitors (for example, to conductor 56 in FIG. 1). In the choke coil of FIG. 1, the current always flows through the coil in the same direction during the discharge cycle, so that the magnetic flux generated in the armature or core has the same polarity and may cause a partial magnetic saturation or bias in the armature, reducing the efficiency of the coil. In the modified choke coil 57, on the other hand, the polarity of the magnetic flux generated in its armature 60 on the discharge of the second capacitor is the reverse of that generated on the previous discharge of the first capacitor, thereby tending to erase any residual magnetic flux bias in that armature.

It is another advantage of the present invention that it provides a simple and reliable circuit for a ventricular defibrillator. Simplicity and reliability are of the utmost importance in this type of apparatus, particularly in portable defibrillators used at outlying places where servicing may not be available. Defibrillator circuits heretofore used generally include a relay or other means for disconnecting the capacitors from the charging source before and during the entire period when the capacitors are being discharged. No such relay or equivalent switch means is needed or desired in the circuit of the present invention, where the capacitors are always connected to the high voltage source, but are momentarily effectively isolated therefrom (and from each other) during their actual discharge by the high resistance, limiting resistors R1 and R2. Not only does this feature of the present invention reduce the number of defibrillator components, making the circuit a most desirable one for a portable defibrillator, but also it is a great convenience in recharging the capacitors in the shortest possible time after their discharge. In fact, because of the continuous recharging feature of this invention, the patient can receive a series of defibrillating shocks as often as every fifteen seconds, which can be of some importance in obstinate cases of fibrillation.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. In a ventricular defibrillator for delivering pulses of electric current from a pair of capacitors to a pair of electrodes in contact with a patient's body, the combination comprising a continuously operative charging circuit that includes a source of high voltage direct current and the two capacitors and two high resistance limiting and isolating resistors, each capacitor being connected in series with a separate one of the resistors and the two series-connected resistor-capacitor combinations being connected in parallel to the current source with the resistors being connected between the capacitors and the same terminal of the current source; and an intermittently operative discharging circuit that includes discharge means for discharging the capacitors separately and successively through the electrodes, the discharging means being operative to reverse with respect to the electrodes the polarity of the second capacitor discharge from that of the first capacitor discharge.

2. Apparatus according to claim 1, in which the discharging circuit also includes an inductance connected between the capacitors and the discharge means.

3. Apparatus according to claim 1, in which the discharge means includes a pair of electrically conducting armatures mounted in fixed axially spaced and insulated relation to each other, means guiding the armatures for axial reciprocation along a defined path, a plurality of axially spaced sets of contact members adapted to be momentarily and successively engaged by the armatures when the latter move along said path, each set of contact members including two contacts separated from each other but lying in substantially the same plane at right angles to the axis of travel of the armatures and adapted to be connected together when bridged by one of the armatures, the first set of contact members when closed connecting the first side of the first capacitor with the first electrode, the second set of contact members when closed connecting the second sides of the first capacitor to the second electrode, the third set of contact members when closed connecting the second side of the second capacitor to the first electrode, the fourth set of contact members when closed connecting the first side of the second capacitor to the second electrode, each set of contact members being axially spaced from an adjacent set by a distance substantially equal to the axial distance between the leading edge of the contact engaging surface of the first armature and the corresponding edge of the second armature, whereby in moving in one direction along said path, the first armature will momentarily and successively connect together the contacts of the second and fourth sets of contact members at the same time as the second armature momentarily and successively connects together the contacts of the first and third sets of contact members respectively.

4. Apparatus according to claim 3, in which an inductance is connected between the second sides of the capacitors and the discharge means.

5. Apparatus according to claim 3, in which an inductance coil, provided with a magnetizable core and a center tap, is connected between the second sides of the capacitors and the discharge means, whereby the magnetic flux generated in the core by the discharge of the first capacitor will have one polarity and that generated by the discharge of the second capacitor will have an opposite polarity.

6. Apparatus according to claim 1 that also includes manual means for discharging both capacitors through a resistance independently of the discharge means and the electrodes.

References Cited by the Examiner

UNITED STATES PATENTS

| | | | |
|---|---|---|---|
| 2,410,499 | 11/1946 | Hinsey | 128—421 |
| 2,534,043 | 12/1950 | MacPhail | 128—423 |
| 2,836,735 | 5/1958 | Kreutzer | 307—110 X |
| 2,864,371 | 12/1958 | Parodi | 128—419 |
| 2,920,193 | 1/1960 | Breckman | 340—173 X |
| 3,077,884 | 2/1963 | Batrow | 128—423 |

FOREIGN PATENTS 766,504   1/1957   Great Britain.

OTHER REFERENCES

Lancet, Dec. 8, 1956, pages 1187–1189.

RICHARD A. GAUDET, *Primary Examiner.*

JORDAN FRANKLIN, *Examiner.*

SIMON BRODER, *Assistant Examiner.*